(12) United States Patent
Mangasarian et al.

(10) Patent No.: US 7,395,253 B2
(45) Date of Patent: Jul. 1, 2008

(54) LAGRANGIAN SUPPORT VECTOR MACHINE

(75) Inventors: Olvi L. Mangasarian, Madison, WI (US); David R. Musicant, Burnsville, MN (US)

(73) Assignee: Wisconsin Alumni Research Foundation, Madison, WI (US)

( * ) Notice: Subject to any disclaimer, the term of this patent is extended or adjusted under 35 U.S.C. 154(b) by 556 days.

(21) Appl. No.: 10/114,419

(22) Filed: Apr. 1, 2002

(65) Prior Publication Data
US 2003/0093393 A1 May 15, 2003

Related U.S. Application Data

(60) Provisional application No. 60/299,099, filed on Jun. 18, 2001.

(51) Int. Cl.
*G06F 17/00* (2006.01)
(52) U.S. Cl. .................. 706/46; 382/155; 382/159; 382/181; 382/224
(58) Field of Classification Search .................. 706/46; 382/155, 159, 181, 224
See application file for complete search history.

(56) References Cited

U.S. PATENT DOCUMENTS

| | | | |
|---|---|---|---|
| 6,112,195 A | 8/2000 | Burges | |
| 6,134,344 A * | 10/2000 | Burges | 382/155 |
| 6,327,581 B1 | 12/2001 | Platt | |
| 6,571,225 B1 | 5/2003 | Oles et al. | |
| 6,728,690 B1 | 4/2004 | Meek et al. | |
| 2002/0165854 A1 | 11/2002 | Blayvas et al. | |
| 2003/0115030 A1 | 6/2003 | Ewing | |
| 2003/0167135 A1 | 9/2003 | Ewing | |
| 2005/0105794 A1 | 5/2005 | Fung | |
| 2005/0119837 A1 | 6/2005 | Prakash et al. | |
| 2005/0171923 A1 | 8/2005 | Kiiveri et al. | |

OTHER PUBLICATIONS

"Generalized Support Vector Machines", O. L. Mangasarian, Technical Report 98-14, Computer Sciences Department, University of Wisconsin, Madison, Wisconsin, Oct. 1998.*

"A tutorial on Support Vector Machines for Pattern Recognition", Christopher J. C. Burges, Data Mining and Knowledge Discovery, 2, 121-167 (1998), Kluwer Academic Publishers, Boston, Manufactured in The Netherlands.*

"Data Discrimination via Nonlinear Generalized Support Vector Machines", O. L. Mangasarian and David R. Musicant, Technical Report 99-03, Computer Sciences Department, University of Wisconsin, Madison, Wisconsin, Mar. 1999.*

(Continued)

*Primary Examiner*—David Vincent
*Assistant Examiner*—Mai T. Tran
(74) *Attorney, Agent, or Firm*—Shumaker & Sieffert, P. A.

(57) ABSTRACT

A Lagrangian support vector machine solves problems having massive data sets (e.g., millions of sample points) by defining an input matrix representing a set of data having an input space with a dimension of n that corresponds to a number of features associated with the data set, generating a support vector machine to solve a system of linear equations corresponding to the input matrix with the system of linear equations defined by a positive definite matrix, and calculating a separating surface with the support vector machine to divide the set of data into two subsets of data

44 Claims, 4 Drawing Sheets

OTHER PUBLICATIONS

"Successive Overrelaxation for Support Vector Machines", O. L. Mangasarian and David R. Musicant, IEEE Transactions On Neural Networks, vol. 10, No. 5, Sep. 1999.*

"RSVM: Reduced Support Vector Machines", Yuh-Jye Lee and Olvi L. Mangasarian, Data Mining Institute Technical Report 00-07, Jul. 2000.*

"Molecular Classification of Human Carcinomas by Use of Gene Expression Signatures", Cancer Research 61, 7388-7393, Oct. 15, 2001.*

"Lagrangian Support Vector Machines" (2000), O. L. Mangasarian, David R. Musicant, Technical report 00-06, Data Mining Institute, Computer Sciences Department, University of Wisconsin, Madison, Wisconsin, USA (Jun. 2000).*

"A Tutorial on Support Vector Machines for Pattern Recognition", Christopher J.C. Burges, Data Mining & Knowledge Discovery, 2, 121-167 (1998).*

W. H. Wolberg an O.L. Mangasarian, "Multisurface Method of Pattern Separation for Medical Diagnosis Applied to Breast Cytology," Proc. Natl. Acad. Sci. USA, vol. 87, pp. 9193-9196, Dec. 1990.

G. Fung and O.L. Mangasarian, "Data Selection for Support Vector Machine Classifiers," Data Mining Institute Technical Report 00-02, Feb. 2000. Proceedings KDD-2000, Aug. 20-23, 2000, Boston. Association for Computing Machinery, New York, 2000, pp. 64-70. ISBN 1-58113-233-6.

Y. -J. Lee and O.L. Mangasarian, "SSVM: A Smooth Support Vector Machine for Classification," Data Mining Institute Technical Report 99-03, Sep. 1999. Computational Optimization and Applications 20, pp. 1-22, 2001.

Y. -J. Lee, O.L. Mangasarian and W.H. Wolberg, "Breast Cancer Survival and Chemotherapy: A Support Vector Machine Analysis," Data Mining Institute Technical Report 99-10, Dec. 1999, DIMACS Series in Discrete Mathematics and Computer Science, vol. 55, American Mathematical Society, pp. 1-10, 2000.

N. Cristianini and John Shawe-Taylor, An Introduction to Support Vector Machines and other Kernel-Based Learning Methods, Cambridge University Press, 2000, ISBN: 0 521 78019 5, 10 pgs.

P.S. Bradley and O.L. Mangasarian, "Feature Selection Via Concave Minimization and Support Vector Machines," Machine Learning Proceedings of the Fifteenth International Conference (ICML '98), Madison, Wisconsin, pp. 82-90, Jul. 24-27, 1998.

G. Fung and O.L. Mangasarian, "Finite Newton Method for Lagrangian Support Vector Machine Classification," Data Mining Institute Technical Report 02-01, pp. 1-22, Feb. 2002.

G. H. Golub and C. F. Van Loan, "Matrix Computations," The John Hopkins University Press, Baltimore, Maryland, 3$^{rd}$ edition, pp. 48-86, 1996.

O.L. Mangasarian, "Parallel Gradient Distribution in Unconstrained Optimization," SIAM Journal on Control and Optimization, 33(6), pp. 1916-1925, Nov. 1995.

S. C. Odewahn et al., "Automated Star/Galaxy Discrimination with Neural Networks," The Astronomical Journal, 103(1), pp. 318-331, Jan. 1992.

M. Trotter, "Support Vector Machines for QSAR Analysis," Department of Computer Science, University College London, undated, 25 pgs.

F. Facchinei, "Minimization of SC Functions and the Maratos Effect," Operations Research Letters, vol. 17, pp. 131-137, 1995.

J. -B. Hiriart-Urruty et al., Generalized Hessian Matrix and Second-Order Optimality Conditions for Probelms with C1, 1 Data, Applied Mathematics & Optimization, vol. 11, pp. 43-56, Feb. 1984.

ILOG CPLEX, http://www.ilog.com/products/cplex, 1 page (last printed Feb. 10, 2004).

S. Lucidi, "A New Result in the Theory and Computation of the Least-Norm Solution of a Linear Program," Journal of Optimization Therory and Applictions, vol. 55, pp. 103-117, Oct. 1987.

O. L. Mangasarian, "Normal Solutions of Linear Programs," Mathematical Programming Study, vol. 22, pp. 206-216, Dec. 1984.

O. L. Mangasarian, "Arbitrary-Norm Separting Plane," Operations Research Letters, vol. 24, No. 1-2, pp. 15-23, Feb. - Mar. 1999.

O. L. Mangasarian, "A Finite Newton Method for Classification Problems," Data Mining Institute Technical Report 01-11, Computer Sciences Department, University of Wisconsin, Dec. 2001, pp. 1-17.

O. L. Mangasarian and R. R. Meyer, "Nonlinear Perturbation of Linear Programs," SIAM Journal on Control and Optimization, 17(6), pp. 745-752, Nov. 1979.

O. L. Mangasarian, "A Newton Method for Linear Programming," PowerPoint Presentation, Mathematics Department, University of California at San Diego, Jul. 26, 2002, 21 pgs.

O. L. Mangasarian, "A Newton Method for Linear Programming," Data Mining Institute Technical Report 02-02, Computer Sciences Department, University of Wisconsin, pp. 1-20, March 2002.

N. E. Ayat et al., "Empirical Error Based Optimization of SVM Kernels: Application to Digit Image Recognition," Proceedings of the Eighth International Workshop on Frontiers in Handwriting Recognition (IWFHR '02), 6 pgs., 2002.

Office Action dated Aug. 3, 2007 for U.S. Appl. No. 10/650,121 filed Aug. 28, 2003, (11 pages).

Barlogie, B., Cussens, J., Hardin, J., Page, D., Shaughnessy, J., Waddell, M., and Zhan, F., "Comparative data mining for microarrays: A case study based on multiple myeloma," Technical Report 1453, Computer Sciences Department, University of Wisconsin, Madison, 22 pages, Nov. 2002.

* cited by examiner

LAGRANGIAN SUPPORT VECTOR MACHINE

This application claims the benefit of U.S. provisional application No. 60/299,099, filed Jun. 18, 2001.

This invention was made with United States government support awarded by the following agencies: DODAF F-49620-00-1-0085. The United States has certain rights in this invention.

BACKGROUND OF THE INVENTION

1. Field of the Invention

This invention relates to support vector machines for separating data based on multiple characteristics. More particularly, it is directed to an apparatus and method for classifying millions of data points into separate classes using a linear or nonlinear separator using a Lagrangian support vector machine.

2. Discussion of the Prior Art

Support vector machines are powerful tools for data classification and are often used for data mining operations. Classification is based on identifying a linear or nonlinear separating surface to discriminate between elements of an extremely large data set containing millions of sample points by tagging each of the sample points with a tag determined by the separating surface. The separating surface depends only on a subset of the original data. This subset of data, which is all that is needed to generate the separating surface, constitutes the set of support vectors. Mathematically, support vectors are data points corresponding to constraints with positive multipliers in a constrained optimization formulation of a support vector machine.

Support vector machines have been used by medical institutions in making diagnostic and prognostic decisions as well as by financial institutions making credit and fraud detection decisions. For example, support vector machines are used to classify breast cancer patients using a criterion that is closely related to the decision whether a patient is prescribed to have chemotherapy treatment or not. This criterion is the presence of metastasized lymph nodes (node-positive) or their absence (node-negative).

By using a linear support vector machine, a number of available features are selected to classify patients into node-positive and node-negative patients. The total number of features used to constitute the n-dimensional space in which the separation is accomplished is made up of the mean, standard error and the maximum value of a certain number of cytological nuclear measurements of the size, shape and texture taken from a patient's breast along with the tumor size. A subset of the features is then used in a nonlinear support vector machine to classify the entire set of patients into three prognosis groups: good (node-negative), intermediate (1 to 4 metastasized lymph nodes) and poor (more than 4 metastasized lymph nodes). The classification method is used to assign new patients to one of the three prognostic groups with an associated survival curve and a possible indication of the utilization of chemotherapy or not.

This classification and data mining process, however, is extremely resource intensive, slow and expensive given current classification tools. To separate the millions of sample points into different data sets, costly linear and quadratic and programming solvers are often used that are complicated and cost prohibitive. Unfortunately, these tools are also very slow in processing and classifying the sample points.

What is needed, therefore, is an apparatus and method for simply and quickly solving problems with millions of sample points using standard tools, thereby eliminating the need for complicated and costly optimization tools. This apparatus and method would need to be based on a simple reformulation of the problem (e.g., an implicit Lagrangian formulation of the dual of a simple reformulation of the standard quadratic program of a linear support vector machine). This reformulation would thereby minimize an unconstrained differentiable convex function in an m-dimensional space where m is the number of points to be classified in a given n-dimensional input space. The necessary optimality condition for the unconstrained minimization problem would therefore be transformed into a simple symmetric positive definite complementary problem, thereby significantly reducing the computational resources necessary to classify the data.

SUMMARY OF THE INVENTION

The present invention is directed to an apparatus and method for classifying data comprising the steps of defining an input matrix representing a set of data having an input space with a dimension of n, wherein n corresponds to a number of features associated with a data set, generating a support vector machine to solve a system of linear equations corresponding to the input matrix, wherein the system of linear equations is defined by a positive definite matrix, and calculating a separating surface with the support vector machine to divide the set of data into a plurality of subsets of data.

According to another aspect of the preferred embodiment of the present invention, a method of classifying data comprises the steps of defining an input matrix representing a set of data having an input space with a dimension of n, wherein n corresponds to a number of features associated with a data set, generating a support vector machine to solve a system of linear equations corresponding to the input matrix, wherein the system of linear equations is defined by a positive definite matrix, and calculating a linear separating surface with the support vector machine to divide the set of data into a plurality of subsets of data.

According to another aspect of the invention, a method of classifying data comprises the steps of defining an input matrix representing a set of data having an input space with a dimension of n, wherein n corresponds to a number of features associated with a data set, generating a support vector machine to solve a system of linear equations corresponding to the input matrix, wherein the system of linear equations is defined by a positive definite matrix, and calculating a nonlinear separating surface with the support vector machine to divide the set of data into a plurality of subsets of data.

According to yet a further aspect of the preferred embodiment of the present invention, a method of determining a separating surface between features of a data set comprises the steps of defining an input matrix A representing the data set having an input space with a dimension of n, wherein n corresponds to a number of the features associated with the data set, constructing a support vector machine to define the separating surface by solving a system of linear equations corresponding to the input matrix A, wherein the system of linear equations is defined by a positive definite matrix with a dimension equal to (n+1), and dividing the data set into a plurality of subsets of data based on the separating surface calculated by the support vector machine.

According to yet another aspect of the preferred embodiment of the present invention, a support vector machine includes an input module that generates an input matrix representing a set of data having an input space with a dimension of n, wherein n corresponds to a number of features associated with a data set, a processor that receives an input signal from the input module representing the input matrix, wherein the processor calculates an output signal representing a solution to a system of linear equations corresponding to the input signal, and the system of linear equations is defined by a positive definite matrix, and an output module that divides the set of data into a plurality of subsets of data based on the output signal from the processor that corresponds to a separating surface between the plurality of subsets of data.

According to yet another aspect of the preferred embodiment of the present invention, a method of classifying patients comprises the steps of defining an input matrix representing a set of patient data having an input space with a dimension of n, wherein n corresponds to a number of features associated with each patent in the set of patient data, generating a support vector machine to solve a system of linear equations corresponding to the input matrix, wherein the system of linear equations is defined by a positive definite matrix, and calculating a separating surface with the support vector machine to divide the set of patient data into a plurality of subsets of data.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
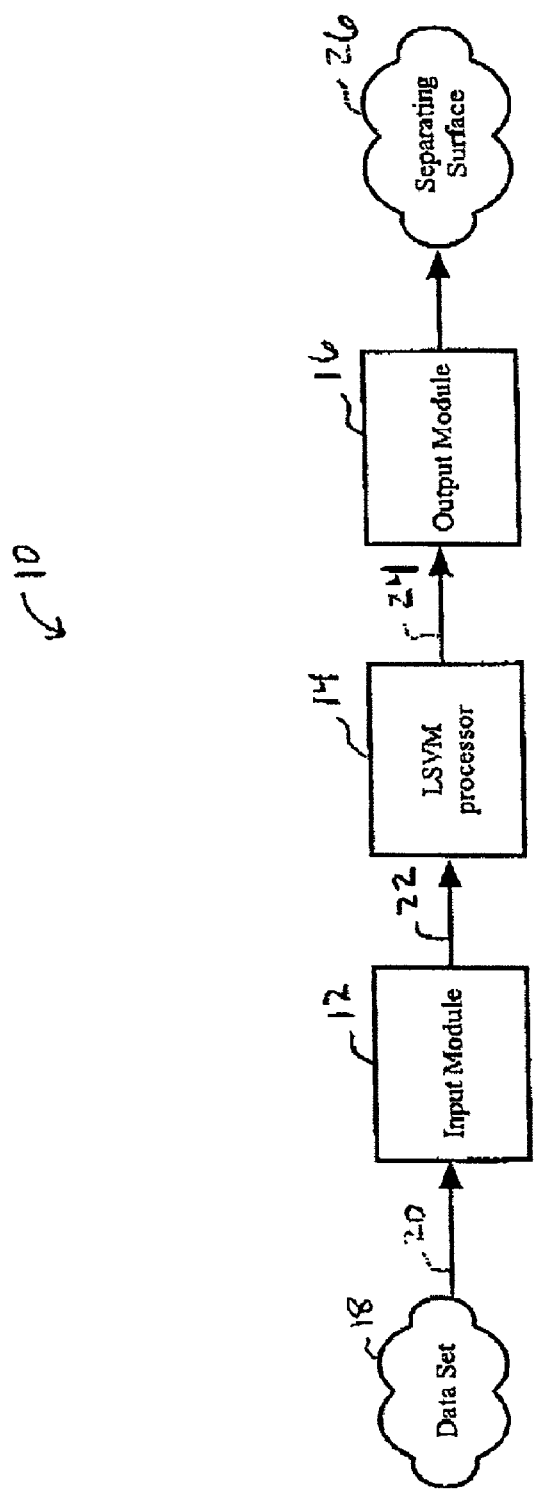
FIG. 1 is a diagram of a Lagrangian support vector machine according to the present invention.

FIG. 1 illustrates a support vector machine 10 (of FIG. 1) based on an implicit Lagrangian for the dual of a simple reformulation of the standard quadratic program of machine 10. This reformulation results in the minimization of an unconstrained differentiable convex function in a space of dimensionality equal to the number of classified points. Lagrangian support vector machine 10 is a simple linearly convergent machine that requires the inversion at the outset of a single matrix of the order of the much smaller dimensionality of the original input space plus one. In the preferred embodiment of the present invention, Lagrangian support vector machine 10 does not require any specialized optimization tools such as linear or quadratic programming solvers. Lagrangian support vector machine 10 also solves nonlinear kernel classification, handles any positive semidefinite kernel, and is guaranteed to converge.

In particular, Lagrangian support vector machine 10 includes an input module 12, a Lagrangian support vector processor 14 and an output module 16. Input module 12 receives a data set 18 via a bus 20 and generates an input matrix representing data set 18. The input matrix has an input space with a dimension of n corresponding to the number of features associated with data set 18.

Processor 14 receives an input signal transmitted from input module 12 via a bus 22 representing the input matrix and calculates an output signal representing a solution to a system of linear equations corresponding to the input signal. A positive definite matrix defines the system of linear equations. Output module 16 receives the output signal via a bus 24 and generates a separating surface 26 to divide the set of data into two subsets of data based on the output signal from processor 14. Separating surface 26 is a linear or nonlinear surface.

LSVM processor 14 constructs the separating surface 26 by using each sample point in the set of data based on an implicit Lagrangian formulation of the dual of a simple reformulation of the standard quadratic program of a linear support vector machine. This leads to the minimization of an unconstrained differential convex function in an m-dimensional space where m is the number of points to be classified in a given n dimensional input space. The necessary optimality condition for this unconstrained minimization problem is transformed into a simple symmetric positive definite complimentary problem.

Figure 2:
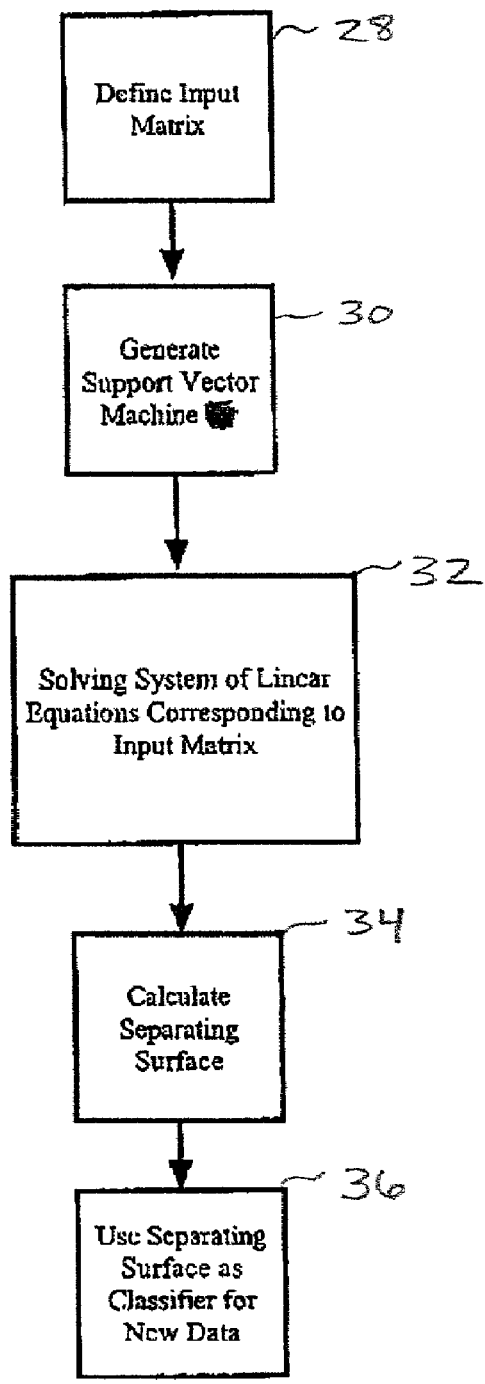
FIG. 2 is a flow chart of a method using a Lagrangian support vector machine to classify sample points into subsets of data according to the present invention.

FIG. 2 illustrates the linearly convergent iterative Lagrangian support vector machine (LSVM) method for solving the minimization problem. In particular, LSVM processor 14 requires the solution, once, of a system of linear equations defined by a positive definite matrix of the order of the dimensionality of the original input space plus one: (n+1), followed by an iterative method for solving an optimization problem. Therefore, processor 14 can solve problems with millions of sample points and requires only standard processing without any optimization tools such as linear or quadratic programming solvers.

In a step 28, an input matrix is defined representing the set of data having an input space with a dimension of n corresponding to the number of features associated with the data set. Thereafter, in a step 30, support vector machine 10 is generated by using a step 32 and solving the system of linear equations corresponding to the input matrix. Machine 10 then calculates the separating surface in a step 34 and uses it to classify new data in a step 36.

Figure 3:
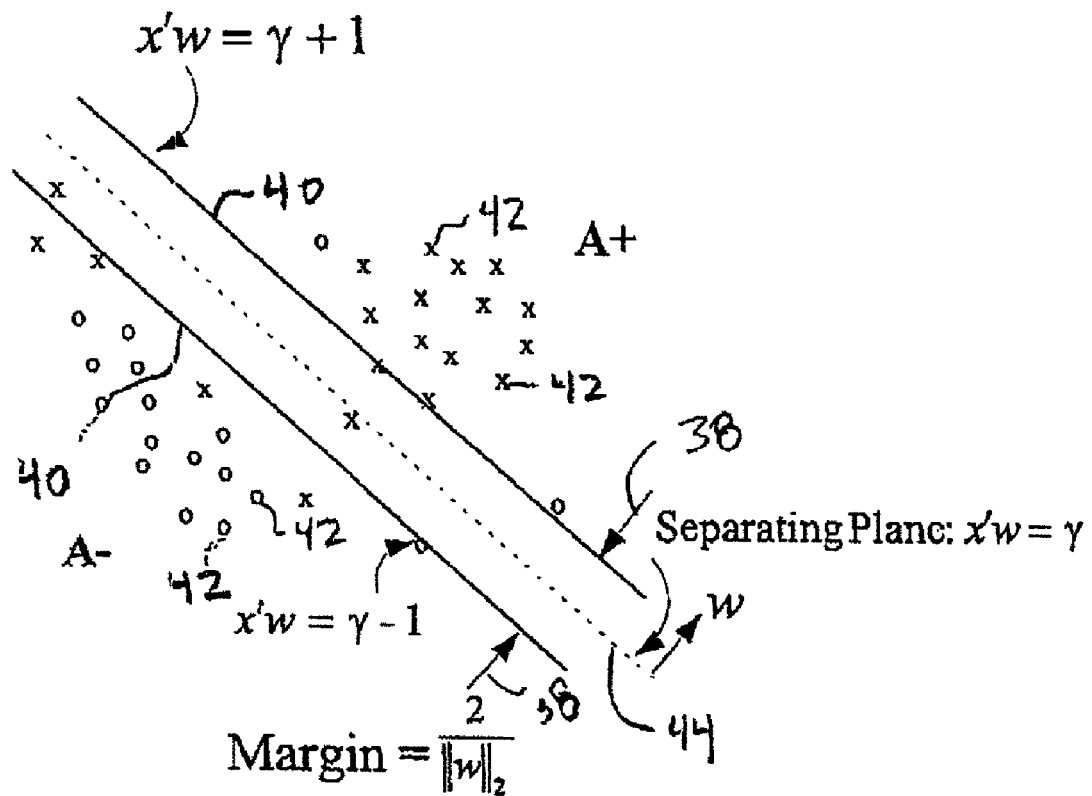
FIG. 3 is a graph of the bounding planes and separating plane generated by the Lagrangian support vector machine according to the present invention.

Referring to FIG. 3, Lagrangian support vector machine 10 is different than a standard linear support vector machine in that a margin (distance) 38 between a set of parallel bounding planes 40 dividing sample points 42 is maximized with respect to both orientation (w) as well as location relative to the origin ($\gamma$). In the preferred embodiment of the present invention, this difference results in a considerably simpler positive definite dual problem with nonnegative constraints only.

Notation

All vectors described in this specification are column vectors unless transposed to a row vector by a prime '. For a vector x in the n-dimensional real space $R^n$, $x_+$ denotes the vector in $R^n$ with all of its negative components set to zero. This corresponds to projecting x onto the nonnegative orthant. The base of the natural logarithms is denoted by $\epsilon$, and for a vector y in $R^m$, $\epsilon^{-y}$ denotes a vector in $R^m$ with components $\epsilon^{-y_i}$, i=1, ..., m. The notation $A \in R^{m \times n}$ signifies a real m×n matrix. For such a matrix, A' denotes the transpose A, $A_i$ denotes the i-th row of A, and $A_{.j}$ denotes the j-th column of A. A vector of ones or zeroes in a real space of arbitrary dimension is denoted by e or 0, respectively. The identity matrix of arbitrary dimension is denoted by I. For two vectors x and y in $R^n$, $x \perp y$ denotes orthogonality, that is x'y=0. Additionally, :=denotes definition. The 2-norm of a vector x and a matrix Q are denoted by $\|x\|$ and $\|Q\|$ respectively. A separating plane 44 (FIG. 3), with respect to two given point sets A and B in $R^n$, is a plane that separates $R^n$ into two halfspaces such that each open halfspace contains points mostly of A or B. In this regard, output module 16 generates separating plane 44 using a special case of the Sherman-Morrison-Woodbury (SMW) identity:

$$\left(\frac{I}{v} + HH'\right)^{-1} = v\left(I - H\left(\frac{I}{v} + H'H\right)^{-1}H'\right)$$

where v is a positive number and H is an arbitrary m×k matrix. This identity, easily verifiable by premultiplying both sides by $$\left(\frac{I}{v} + HH'\right),$$

enables inversion of a large m×m matrix by merely inverting a smaller k×k matrix.

Linear Support Vector Machines

Processor 14 classifies m points in the n-dimensional real space $R^n$, represented by the m×n matrix A, according to membership of each point $A_i$ in the class A+ or A− as specified by a given m×m diagonal matrix D with plus ones or minus ones along its diagonal. For this problem, a standard support vector machine with a linear kernel is given by the following quadratic program with parameter v>0:

$$\min_{(w, \gamma, y) \in R^{n+1+m}} ve'y + \frac{1}{2}w'w \text{ s.t. } D(Aw - e\gamma) + y \geq e, y \geq 0. \quad (2)$$

wherein w is the normal to the bounding planes 40:

$$x'w = \gamma \pm 1 \quad (3)$$

and $\gamma$ determines their location relative to the origin (FIG. 3). Bounding plane 40 defined by x'w=γ+1 bounds the class A+ points, possibly with some error, and the bounding plane 40 defined by x'w=γ−1 bounds the class A− points, also possibly with some error. The linear separating surface is plane 44 defined by:

$$x'w = \gamma, \quad (4)$$

midway between the bounding planes 40. The quadratic term in (2) is twice the reciprocal of the square of the 2-norm distance $2/\|w\|_2$ between the two bounding planes 40 (FIG. 3). This term maximizes this distance that is often called "margin" 38. If the classes are linearly inseparable, as depicted in FIG. 3, then planes 40 bound the two classes with a "soft margin". That is, planes 40 bound each set approximately with some error determined by the nonnegative error variable y:

$$A_i w + y_i \geq \gamma + 1, \text{ for } D_{ii} = 1,$$

$$A_i w - y_i \leq \gamma - 1, \text{ for } D_{ii} = -1. \quad (5)$$

Traditionally the 1-norm of the error variable y is minimized parametrically with weight v in (2) resulting in an approximate separation as illustrated in FIG. 3. The dual to the standard quadratic linear SVM (2) is the following:

$$\min_{u \in R^m} \frac{1}{2} u' DAA' Du - e'u \text{ s.t. } e' Du = 0, 0 \leq u \leq ve. \quad (6)$$

The variables (w,γ) of the primal problem (2) which determine separating surface 44 are obtained from the solution of the dual problem (6). In this regard, matrix DAA'D appearing in the dual objective function (6) is not positive definite in general because typically m>>n. Also, there is an equality constraint present, in addition to bound constraints, which for large problems necessitate special computational procedures. Furthermore, a one-dimensional optimization problem must be solved in order to determine the locator γ of separating surface 44.

In order to overcome all these difficulties as well as that of dealing with the necessity of having to essentially invert a very large matrix of the order of m×m, the preferred embodiment of the present invention includes critical modifications to the standard support vector machine formulation.

Lagrangian Support Vector Machine

In the preferred embodiment of the present invention, Lagrangian support vector machine 10 is generated by changing the 1-norm of y to a 2-norm squared which makes the constraint y≧0 redundant. The term $\gamma^2$ is also appended to w'w, thereby maximizing margin 38 between the parallel bounding planes 40 with respect to both w and γ (e.g., with respect to both orientation and location of the planes, rather that just with respect to w which merely determines the orientation of the plane). Therefore, Lagrangian support vector machine 10 in the present invention is defined by:

$$\min_{(w,\gamma,y) \in R^{n+1+m}} v\frac{y'y}{2} + \frac{1}{2}(w'w + \gamma^2) \text{ s.t. } D(Aw - e\gamma) + y \geq e. \quad (7)$$

for which the dual is:

$$\min_{0 \leq u \in R^m} \frac{1}{2} u'\left(\frac{I}{v} + D(AA' + ee')D\right)u = e'u. \quad (8)$$

The variables (w,γ) of the primal problem which determine separating surface 44 are recovered directly from the solution of the dual (8) above by the relations:

$$w = A'Du, y = \frac{u}{v}, \gamma = -e'Du. \quad (9)$$

The matrix appearing in the dual objective function is positive definite and there is no equality constraint and no upper bound on the dual variable u. The only constraint present is a nonnegativity constraint. Based on these facts, Lagrangian support vector processor 14 implements an iterative method (FIG. 2) that requires the solution of a single system of linear equations, determined by an (n+1)×(n+1) matrix, at the beginning of the method followed by a straightforward linearly convergent iterative scheme that requires no optimization package.

Operation Of Lagrangian Support Vector Machine

The following two matrices are defined to simplify notation:

$$H = D[A \ -e], Q = \frac{I}{v} + HH'. \tag{10}$$

With these definitions, the dual problem (8) becomes $$\min_{0 \leq u \in R^m} f(u) := \frac{1}{2} u' Q u - e' u. \tag{11}$$

The single time that $Q^{-1}$ is computed at the outset of the method illustrated in FIG. 2, SMW identity (1) is used. Therefore, only a (n+1)×(n+1) matrix is inverted.

Necessary and sufficient optimality conditions for the dual problem (11) generate:

$$0 \leq u \perp Qu - e \geq 0. \tag{12}$$

Therefore, by using an established identity between any two real numbers (or vectors) a and b:

$$0 \leq a \perp b \geq 0 \Leftrightarrow a = (a - \alpha b)_+, \alpha > 0, \tag{13}$$

wherein the optimality condition (12) can be then written in the following equivalent form for any positive α:

$$Qu - e = ((Qu - e) - \alpha u)_+. \tag{14}$$

These optimality conditions lead to processor 14 implementing the following simple iterative scheme that constitutes the method illustrated in FIG. 2:

$$u^{i+1} = Q^{-1}(e + ((Qu^i - e) - \alpha u^i)_+), i = 0, 1, \ldots, \tag{15}$$

for which global linear convergence is established from any starting point under the condition:

$$0 < \alpha < \frac{2}{v}. \tag{16}$$

In the preferred embodiment of the present invention, this condition is implemented as $\alpha = 1.9/v$, wherein v is the parameter of the SVM formulation (7). As a result, the optimality condition (14) is also the necessary and sufficient condition for the unconstrained minimum of the implicit Lagrangian associated with the dual problem (11):

$$\min_{u \in R^m} L(u, \alpha) = \tag{17}$$

-continued $$\min_{u \in R^m} \frac{1}{2} u' Q u - e' u + \frac{1}{2\alpha} (\|(-\alpha u + Q u - e)_+\|^2 - \|Qu - e\|^2).$$

Processor 14 sets the gradient with respect to u of this convex and differentiable Lagrangian to zero so that:

$$(Qu - e) + \frac{1}{\alpha}(Q - \alpha I)((Q - \alpha I)u - e)_+ - \frac{1}{\alpha} Q(Q_u - e) = 0, \tag{18}$$

or equivalently:

$$(\alpha I - Q)((Qu - e) - ((Q - \alpha I)u - e)_+) = 0 \tag{19}$$

that is equivalent to the optimality condition (14) under the assumption that α is positive and not an eigenvalue of Q.

Lagrangian support vector machine 10 achieves global linear convergence of iteration (15) under condition (16) given as follows:

Let Q in $R^{m \times m}$ be the symmetric positive definite matrix defined by (10) and let (16) hold. Starting with an arbitrary $u^0 \in R^m$, the iterates $u^i$ of (15) converge to the unique solution $\bar{u}$ of (11) at the linear rate:

$$\|Qu^{i+1} - Q\bar{u}\| \leq \|I - \alpha Q^{-1}\| \cdot \|Qu^i - Q\bar{u}\|. \tag{20}$$

In the preferred embodiment of the present invention, LSVM processor 14 generates the linear and nonlinear separators by implementing the method illustrated in FIG. 2 using standard scientific mathematical software packages (e.g., MATLAB™, a product trademarked by MathWorks).

For example, using (15) with standard MATLAB™ commands, processor 14 solves problems with millions of sample points using only MATLAB™ commands. The input parameters, besides A, D and v of (10), which define the problem, are: itmax, the maximum number of iterations and tol, the tolerated nonzero error in $\|u^{i+1} - u^i\|$ at termination. The quantity $\|u^{i+1} - u^i\|$ bounds from above:

$$\|Q\|^{-1} \cdot \|Qu^i - e - ((Qu^i - e) - \alpha u^i)_+\|, \tag{21}$$

which measures the violation of the optimality criterion (14). It follows that $\|u^{i+1} - u^i\|$ also bounds $\|u^i - \bar{u}\|$, and by (9) it also bounds $\|w^i - \bar{w}\|$ and $\|\gamma^i - \bar{\gamma}\|$, where $(\bar{w}, \bar{\gamma}, \bar{y})$ is the unique solution of the primal SVM (7).

Implementation for Classifier Solution Using Matlab™ Commands

```
function [it, opt, w, gamma] = svml (A, D, nu, itmax, tol)
% lsvm with SMW for min ½*u'*Q*u-e'*u s.t. u=>0,
% Q=I/nu+H*H', H=D[A -e]
% Input: A, D, nu, itmax, tol; Output: it, opt, w, gamma
% [it, opt, w, gamma] = svml (A, D, nu, itmax, tol);
    [m,n] =size (A); alpha=1.9/nu; e=ones (m,1); H=D* [A -e] ; it=0;
    S=H*inv ( (speye (n+1) /nu+H'*H) ) ;
    u=nu* (1-S* (H' *e) ); oldu=u+1;
    while it<itmax & norm (oldu-u) >tol
        z= (1+pl ( ( (u/nu+H* (H' *u) ) -alpha*u) -1) ) ;
        oldu=u;
        u=nu* (z-S* (H' *z) ) ;
        it=it+1;
    end;
    opt=norm(u-oldu) ;w=A' *D*u;gamma=-e' *D*u;
function pl = pl (x) ; pl = (abs (x) +x) /2;
```

Lagrangian Support Vector Machines for Nonlinear Kernels

Lagrangian support vector machine 10 is also used to solve classification problems with positive semidefinite nonlinear kernels. The method implemented by processor 14 as illustrated in FIG. 2 using, for example, the MATLAB™ commands defined above and its convergence is extended for the following nonlinear kernels described below which generate a nonlinear classifier.

In this regard, problems with large datasets are handled using the Sherman-Morrison-Woodbury (SMW) identity (1) only if the inner product terms of the kernel (3) are explicitly known. In this regard, LSVM processor 14 is a useful tool for classification with nonlinear kernels because of the following implementation as also illustrated, for example, using MATLAB™ commands and not making use of the Sherman-Morrison-Woodbury identity or any optimization package.

For $A \in R^{m \times n}$ and $B \in R^{n \times 1}$, the kernel $K(A, B)$ maps $R^{m \times n} \times R^{n \times 1}$ into $R^{m \times 1}$. A typical kernel is the Gaussian kernel $\epsilon^{-\mu \|A'_i - B_j\|^2}$, $i,j=1, \ldots, m, l=m$, where $\epsilon$ is the base of natural logarithms, while a linear kernel is $K(A,B)=AB$. For a column vector $x$ in $R^n$, $(x', A')$ is a row vector in $R^m$, and the linear separating surface (4) is replaced by the nonlinear surface $$K\left([x'-1], \begin{bmatrix} A' \\ -e' \end{bmatrix}\right) Du = 0, \quad (22)$$

where u is the solution of the dual problem (11) with Q re-defined for a general nonlinear kernel as follows:

$$G = [A \ -e], Q = \frac{I}{v} + DK(G, G')D. \quad (23)$$

The nonlinear separating surface (22) degenerates to the linear one (4) if $K(G, G')=GG'$ and (9) is utilized.

The dual problem for a linear kernel (8) is written in the following equivalent form:

$$\min_{0 \leq u \in R^m} \frac{1}{2} u' \left(\frac{I}{v} + DGG'D\right) u - e'u. \quad (24)$$

and the linear kernel GG' is replaced by a general nonlinear positive semidefinite symmetric kernel $K(G, G')$ to obtain:

$$\min_{0 \leq u \in R^m} \frac{1}{2} u' \left(\frac{I}{v} + DK(G, G')D\right) u - e'u. \quad (25)$$

This is the formulation given above in (23). The Karush-Kuhn-Tucker necessary and sufficient optimality conditions for this problem are:

$$0 \leq u \perp \left(\frac{I}{v} + DK\left([A \ -e], \begin{bmatrix} A' \\ -e' \end{bmatrix}\right) u - e \geq 0\right) \quad (26)$$

which is the basis for a nonlinear support vector machine with a positive semidefinite kernel $K(G, G')$. The positive semidefiniteness of the nonlinear kernel $K(G, G')$ is needed in order to ensure the existence of a solution to both (25) and (26).

The above-referenced results remain valid, with Q redefined as above for any positive semidefinite kernel K. This includes the iterative scheme (15) and the convergence result given under the above MATLAB™ commands. However, because the Sherman-Morrison-Woodbury identity for a nonlinear kernel is not used, the MATLAB™ commands used to generate a solution for a nonlinear solution are different than commands to generate the linear solution.

Implementation for Nonlinear Classifier Using Matlab™ Commands

```
function [it, opt,u] = svmlk (nu,itmax,tol,D,KM)
% lsvm with nonlinear kernel for min ½*u'*Q*u-e'*u s.t. u=>0
% Q=I/nu+DK(G,G')D, G= [A -e]
% Input: nu, itmax, tol, D, KM=K(G,G')
% [it, opt, u) = svmlk (nu,itmax,tol,D,KM) ;
    m=size (KM,1) ; alpha =1.9/nu;e=ones(m,1) ;I=speye(m) ;it=0;
    Q=I/nu+D*KM*D;P=inv(Q);
    u=P*e;oldu=u+1;
    while it<itmax & norm(oldu-u) >tol
        oldu=u;
        u=P* (1+pl (Q*u-1-alpha*u) ) ;
        it=it+1;
    end;
    opt=norm(u-oldu) ; [it opt]
function pl = pl (x) ; pl = (abs (x) +x) /2;
```

The implementation of the method illustrated in FIG. 2 by processor 14 is straightforward and fast as described above. For example, applying the method of FIG. 2 to randomly generated problems to test the speed and effectiveness of LSVM processor 14 on large problems using a Pentium III 500 MHz notebook with 384 megabytes of memory (and additional swap space) on 2 million randomly generated points in $R^{10}$ with $$v = \frac{1}{m} \text{ and } \alpha = \frac{1.9}{v}$$

resulted in LSVM processor 14 solving the problem in 6 iterations in 81.52 minutes to an optimality criterion of 9.398e−5 on a 2-norm violation of (14). The same problem was solved in the same number of iterations and to the same accuracy in 6.74 minutes on a 250 MHz UltraSPARC II processor with 2 gigabytes of memory.

Additional experiments were conducted using a 400 MHz Pentium II Xeon processor and a maximum of 2 Gigabytes of memory available for each process. The computer used Windows NT Server 4.0, with MATLAB 5.3.1. A set of experiments comparing LSVM processor 14 to SVM$^{light}$ were run on a 250 MHz UltraSPARC II processor with a maximum of 8 Gigabytes of memory available running MATLAB 5.3.0 under an experimental version of Solaris 5.6.

Table 1 below illustrates experimental results indicating that the reformulation of the standard vector machine as implemented by processor 14 and described above performs similarly to SVM-QP, the conventional SVM. Results are also shown for an active set SVM (ASVM) method. For six data sets, tenfold cross validation was performed in order to compare test set accuracies between the methods. Moreover, a tuning set for each algorithm was utilized to find the optimal value of the parameter v. For both LSVM and ASVM, an optimality tolerance of 0.001 was used to determine when to terminate. SVM-QP was implemented using the high-performing CPLEX barrier quadratic programming solver with its default stopping criterion. Altering the CPLEX default stopping criterion to match that of LSVM did not result in significant change in timing relative to LSVM, but did reduce test set correctness for SVM-QP. The results in Table 1 include both normalized data (by subtracting the mean and dividing by the standard deviation) and unnormalized data.

TABLE 1

| Dataset m × n | Algorithm | Normalized | | | Not Normalized | | |
|---|---|---|---|---|---|---|---|
| | | Training Correctness | Testing Correctness | Time (CPU sec) | Training Correctness | Testing Correctness | Time (CPU sec) |
| Liver | SVM-QP | 70.69% | 66.95% | 9.89 | 70.69% | 68.41% | 8.00 |
| Disorders | ASVM | 70.21% | 68.68% | 0.03 | 70.24% | 67.24% | 0.04 |
| 345 × 6 | LSVM | 70.21% | 68.68% | 0.10 | 70.24% | 67.24% | 0.14 |
| Cleveland | SVM-QP | 87.84% | 85.20% | 5.06 | 87.84% | 85.20% | 4.76 |
| Heart | ASVM | 86.12% | 85.91% | 0.03 | 87.06% | 85.20% | 0.05 |
| 287 × 13 | LSVM | 86.12% | 85.91% | 0.01 | 87.06% | 85.20% | 0.17 |
| Pima Diabetes | SVM-QP | 77.91% | 77.21% | 166.29 | 77.94% | 77.21% | 138.40 |
| 768 × 8 | ASVM | 78.02% | 77.99% | 0.09 | 78.05% | 77.99% | 0.09 |
| | LSVM | 78.02% | 77.99% | 0.03 | 78.05% | 77.99% | 0.54 |
| Ionosphere | SVM-QP | 90.25% | 87.18% | 1.23 | 90.25% | 87.18% | 1.16 |
| 351 × 34 | ASVM | 94.05% | 89.17% | 0.94 | 94.05% | 89.17% | 0.94 |
| | LSVM | 94.02% | 89.17% | 0.90 | 94.02% | 89.17% | 0.89 |
| Tic Tac Toe | SVM-QP | 65.34% | 65.34% | 178.63 | 65.34% | 65.34% | 173.71 |
| 958 × 9 | ASVM | 70.32% | 69.72% | 0.05 | 70.17% | 69.61% | 0.05 |
| | LSVM | 70.32% | 69.72% | 0.02 | 70.17% | 69.61% | 0.02 |
| Votes | SVM-QP | 97.55% | 95.85% | 59.02 | 97.55% | 95.85% | 46.02 |
| 435 × 16 | ASVM | 95.30% | 94.70% | 0.08 | 95.27% | 95.16% | 0.08 |
| | LSVM | 95.30% | 94.70% | 0.07 | 95.27% | 95.16% | 0.07 |

Table 1: Comparison of LSVM with SVM-QP and ASVM. LSVM Test Correctness is Comparable to that of SVM-QP, but Much Faster, e.g. 8900 Times Faster than SVM-QP on Normalized Tic-Tac-Toe.

The results outlined above in Table 1 illustrate that the method of FIG. 2 as implemented by LSVM processor 14 performs comparably to SVM-QP with respect to generalizability but is considerably faster. Additionally, the method implemented by LSVM processor 14 is dramatically simpler than SVM-QP and ASVM (another support vector machine method).

Table 2 compares the method implemented by LSVM processor 14 with SVM$^{light}$ on the Adult dataset, which is commonly used to compare standard SVM methods. The results below demonstrate that for the largest training sets, the method of FIG. 2 as implemented by LSVM processor 14 performs faster than SVM$^{light}$ with similar test set accuracies. SVM$^{light}$ defines an iteration as solving an optimization problem over a small number, or "chunk," of constraints. LSVM, on the other hand, defines an iteration as a matrix calculation that updates all the dual variables simultaneously. These two numbers are not directly comparable, and are included here only for purposes of monitoring scalability.

TABLE 2

| Training Set Size | CPU Sec SVM$^{light}$ | Iterations SVM$^{light}$ | Test Set Accuracy SVM$^{light}$ |
|---|---|---|---|
| | LSVM | LSVM | LSVM |
| 1605 | 2.0 | 149 | 84.05% |
| | 3.3 | 38 | 84.27% |

TABLE 2-continued

| Training Set Size | CPU Sec SVM$^{light}$ | Iterations SVM$^{light}$ | Test Set Accuracy SVM$^{light}$ |
|---|---|---|---|
| 2265 | 3.6 | 299 | 84.38% |
| | 5.0 | 40 | 84.66% |
| 3185 | 5.1 | 401 | 84.22% |

TABLE 2-continued

| Training Set Size | CPU Sec SVM$^{light}$ | Iterations SVM$^{light}$ | Test Set Accuracy SVM$^{light}$ |
|---|---|---|---|
| | 8.1 | 43 | 84.55% |
| 4781 | 7.2 | 574 | 84.33% |
| | 13.4 | 46 | 84.55% |
| 6414 | 13.5 | 729 | 84.47% |
| | 18.8 | 47 | 84.68% |
| 11221 | 25.5 | 1154 | 84.58% |
| | 38.9 | 50 | 84.84% |
| 16101 | 49.2 | 1831 | 84.81% |
| | 60.5 | 52 | 85.01% |
| 22697 | 95.6 | 2622 | 85.16% |
| | 92.0 | 54 | 85.35% |
| 32562 | 178.3 | 4497 | 85.02% |
| | 140.9 | 55 | 85.05% |

Table 2: Comparison of LSVM with SVM$^{light}$ on an Adult Dataset. LSVM Test Correctness is Comparable to that of SVM$^{light}$, but is Faster on Large Datasets. (v=0.03)

Table 3 illustrates results from running the method in FIG. 2 as implemented by LSVM processor 14 on a massively sized dataset. The results demonstrate that the LSVM method solves massive problems quickly. For these experiments, all of the data was brought into memory. As such, the running time reported consists of the time used to actually solve the problem to termination excluding I/O time. This is consistent with the measurement techniques used by those skilled in the art.

TABLE 3

| # of Points | # of Attributes | Iterations | Training Correctness | Testing Correctness | Time (CPU min) |
|---|---|---|---|---|---|
| 2 million | 10 | 81 | 69.80% | 69.44% | 33.6 |

Table 3: Performance of ASVM on NDC Generated Dataset. (v=0.1)

Additional experiments demonstrate the effectiveness of the method of FIG. 2 as implemented by LSVM processor 14 in solving nonlinear classification problems through the use of kernel functions. One highly nonlinearly separable but simple example is the checkerboard classification generated by LSVM and illustrated in FIG. 4, which is typically used to demonstrate the effectiveness of nonlinear kernel methods on a dataset for which a linear separation clearly fails. The checkerboard dataset 46 contains 1000 points randomly sampled from a checkerboard. These points are used as a training set for LSVM processor 14 to try to reproduce an accurate rendering of a checkerboard. The following Gaussian kernel is applied to this problem:

$$K(G, G') = \exp(-2 \cdot 10^{-4} \|G'_i - G_j\|_2^2), i,j = 1, \ldots, m \quad (27)$$

Figure 4:
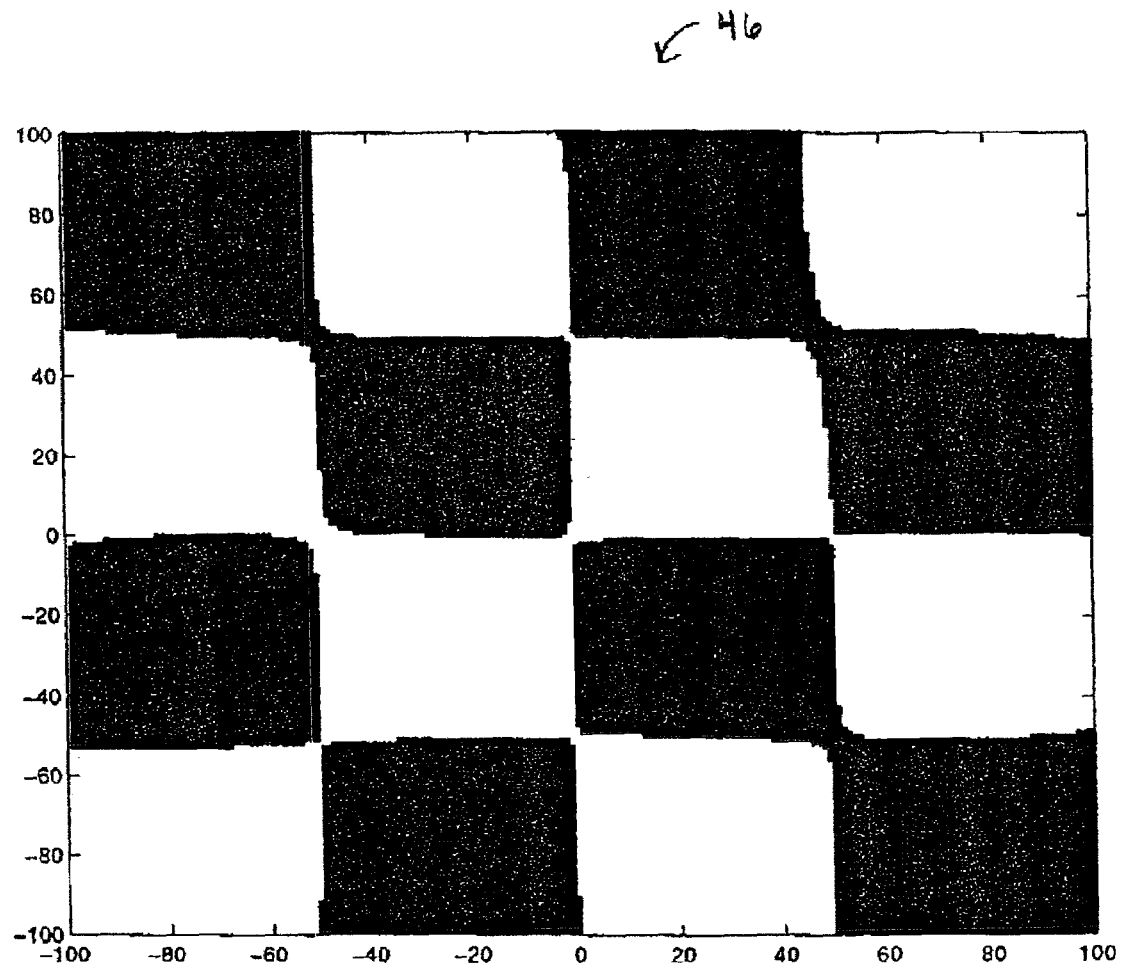
FIG. 4 is an illustration of applying a Lagrangian support vector machine to a training set of data according to the present invention.

FIG. 4 clearly demonstrates that the LSVM processor 14 demonstrates superior generalization capability on dataset 46 when compared to standard support vector machine methods. The time to solve the checkerboard problem using LSVM processor 14 with the above Gaussian kernel was 2.85 hours on the University of Wisconsin Locop2 Pentium II Xeon machine.

Therefore, the method of FIG. 2 implemented by LSVM processor 14 is a fast and simple method that results in decreased coding time, thereby significantly decreasing the amount of programming resources necessary to solve problems with very large data sets. Processor 14 classifies datasets with millions of sample points using standard inexpensive mathematical and scientific programming packages. For a linear kernel, LSVM processor 14 is an iterative method that requires nothing more complex than the inversion of a single matrix of the order of the input space plus one, therefore having the ability to handle massive problems. For a positive semidefinite nonlinear kernel, LSVM processor 14 inverts a single matrix in the space of dimension equal to the number of classified points.

The scope of the application is not to be limited by the description of the preferred embodiments described above, but is to be limited solely by the scope of the claims that follow. For example, having all the data in memory is simpler to code and results in faster running times. However, it is not a fundamental requirement of the method illustrated in FIG. 2. Block matrix multiplications, incremental evaluations of the method illustrated in FIG. 2—block matrix multiplications, incremental evaluations of $Q^{-1}$ using the Sherman-Morrison-Woodbury identity, and indices on the dataset can also be used to create an efficient disk-based version of the method implemented by LSVM processor 14.

What is claimed is:

1. A computer-implemented method of classifying numerical data sets comprising the steps of:
defining an input matrix A with m rows and n columns representing a set of m numerical data points having an input space with a dimension of n, wherein n corresponds to a number of features associated with the numerical data set and each row belongs to either class A+ or A−, and further wherein the numerical data set represents medical data;
generating a support vector machine by solving a quadratic programming problem corresponding to the input matrix, wherein the quadratic programming problem is defined by a positive definite matrix Q:

$$Q = \frac{I}{v} + HH',$$

wherein H=D[A−e], H' is the transpose of H, I is an identity matrix, e is a vector of ones, D is a diagonal matrix of plus and minus ]'s wherein a value on a diagonal of the D matrix is +1 if the corresponding row of the A matrix is in the class of A+ and −1 if the correspondina row of the A matrix is in the class of A−, and v is a parameter associated with a distance between a pair of parallel bounding planes;
calculating a linear separating surface with the support vector machine by iteratively calculating a value u defined by:

$$u^{i+1} = Q^{-1}(e + ((Qu^i - e) - \alpha u^i)_+), i = 0, 1, \ldots$$

wherein $$0 < \alpha < \frac{2}{v}$$

and the + subscript replaces negative components by zeros; and
dividing the set of numerical data into a plurality of subsets of data using the linear separating surface in the n-dimensional x space: x'w=γ, where x' is the transpose of a vector x, w is orthogonal to the separating surface and γ locates the separating surface relative to an origin, wherein the plurality of subsets include at least a good prognostic set of medical data and a poor prognostic set of medical data that are located on opposite sides of the separating surface.

2. A method according to claim 1, wherein a dimension of the positive definite matrix is equal to the dimension of (n+1).

3. A method according to claim 1, wherein the linear separating surface is midway between the pair of parallel bounding planes $$x'w = \gamma + 1 \text{ and } x'w = \gamma - 1.$$

4. A method according to claim 1, further comprising the step of solving the following quadratic programming problem:

$$\min_{0 \leq u \in R^m} f(u) := \frac{1}{2} u'Qu - e'u.$$

where u' is the transpose of u and e' is the transpose of e.

5. A method according to claim 1, wherein the vector w that is normal to the linear separating surface is given by:

$$w = A'Du.$$

where A' is the transpose of A.

6. A method according to claim 1, wherein the locator coordinate γ that locates the linear separating surface relative to the origin is given by:

$$\gamma = -e'Du.$$

where e' is the transpose of e.

7. A method according to claim 1, wherein dividing the set of numerical data comprises dividing the set of numerical data into the good prognostic set of medical data and the poor prognostic set of medical data to prescribe a course of treatment for the patient.

8. A method according to claim 1, wherein dividing the set of numerical data comprises dividing the set of numerical data into the good prognostic set of medical data and the poor prognostic set of medical data to predict an effectiveness of chemotherapy.

9. A method according to claim 1, wherein dividing the set of numerical data comprises dividing the set of numerical data into the good prognostic set of medical data and the poor prognostic set of medical data to associate a patient with a survival curve.

10. A computer-implemented method of classifying a numerical data set comprising the steps of:
defining an input matrix A with m rows and n columns representing a set of m numerical data points having an input space with a dimension of n, wherein n corresponds to a number of features associated with the numerical data set and each row belongs to either class A+ or A−, and further wherein the numerical data set represents medical data;
generating a support vector machine by solving a quadratic programming problem corresponding to the input matrix, wherein the quadratic programming problem is defined by a positive definite matrix Q:

$$Q = \frac{I}{v} + DK(G, G')D,$$

wherein G=[A−e], G' is the transpose of G, v is a parameter associated with a distance between a pair of parallel bounding surfaces, I is an identity matrix, e is a vector of ones, D is a diagonal matrix of plus and minus 1's wherein a value on a diagonal of the D matrix is +1 if the corresponding row of the A matrix is in the class of A+ and −1 if the corresponding row of the A matrix is in the class of A−, and K is a mathematical kernel;
calculating a nonlinear separating surface with the support vector machine by iteratively calculating a value u defined by:

$$u^{i+1}=Q^{-1}(e+((Qu^i-e)-\alpha u^i)_+), i=0,1,...;$$

wherein $$0 < \alpha < \frac{2}{v}$$

and the + subscript replaces negative components by zeros; and
dividing the set of numerical data into a plurality of subsets of data using the nonlinear separating surface, wherein the plurality of subsets of data include at least a lymph node-positive set of medical data and a lymph node-negative set of medical data that are located on opposite sides of the nonlinear separating surface.

11. A method according to claim 10, wherein a dimension of the positive definite matrix is equal to the dimension of (n+1).

12. A method according to claim 10, wherein the kernel K is a positive semidefinite kernel.

13. A method according to claim 10, wherein the kernel $K(A,B)$ maps $R^{m \times n} \times R^{n \times k}$ into $R^{m \times k}$ for $A \in R^{m \times n}$ and $B \in R^{n \times k}$.

14. A method according to claim 13, wherein the kernel $K(A,B)$ is a Gaussian kernel.

15. A method according to claim 10, further comprising the step of solving the quadratic programming problem:

$$\min_{0 \le u \in R^m} f(u) := \frac{1}{2}u'Qu - e'u.$$

where u' is the transpose of u and e' is the transpose of e.

16. A method according to claim 10, wherein the nonlinear separating surface is defined by:

$$K\left([x' \quad -1], \begin{bmatrix} A' \\ -e' \end{bmatrix}\right)Du = 0.$$

where x' is the transpose of an n-dimensional vector x, A' is the transpose of A and e' is the transpose of e.

17. A method according to claim 10, wherein dividing the set of numerical data comprises dividing the set of numerical data into the lymph node-positive set of data and the lymph node-negative set of data for diagnosing breast cancer within a patient.

18. A method according to claim 10, wherein the set of numerical data comprises a set of data indicating presence of metastasized lymph nodes.

19. A computer-implemented method of classifying a numerical data set comprising the steps of:
defining an input matrix A with m rows and n columns representing a set of m numerical data points having an input space with a dimension of n, wherein n corresponds to a number of features associated with the data set and each row belongs to either class A+ or A−, and further wherein the numerical data set represents financial data;
generating a support vector machine by solving a quadratic programming problem corresponding to the input matrix, wherein the quadratic programming problem is defined by a positive definite matrix Q:

$$Q = \frac{I}{v} + HH',$$

wherein H=D[A−e], H' is the transpose of H, I is an identity matrix, v is a parameter associated with a distance between a pair of parallel bounding planes, e is a vector of ones, and D is a diagonal matrix of plus and minus 1's wherein a valve on a diagonal of the D matrix is −1 if the corresponding row of the A matrix is in the class of A+ and −1 if the corresponding row of the A matrix is in the class of A−;
calculating a linear separating surface with the support vector machine by iteratively calculating a value u defined by:

$$u^{i+1}=Q^{-1}(e+((Qu^i-e)-\alpha u^i)_+), i=0,1,...;$$

wherein $$0 < \alpha < \frac{2}{v}$$

and the + subscript replaces negative components by zeros; and dividing the set of financial data into at least two subsets of data using the linear separating surface in the n-dimensional x space: x'w=γ, where x' is the transpose of x, w is orthogonal to the separating surface and γ locates the separating surface relative to an origin, wherein the two subsets of data are located on opposite sides of the separating surface and include at least two subsets of data to make one of a fraud detection decision and a credit decision.

20. A method according to claim 19, wherein a dimension of the positive definite matrix is equal to the dimension of (n+1).

21. A method according to claim 19, wherein the separating surface is a linear surface.

22. A method according to claim 19, wherein the linear separating surface is midway between the pair of parallel bounding planes x'w=γ+1 and x'w=γ−1.

23. A method according to claim 19, further comprising the step of solving the following quadratic programming problem:

$$\min_{0 \le u \in R^m} f(u) := \frac{1}{2} u'Qu - e'u,$$

where u' is the transpose of u and e' is the transpose of e.

24. A method according to claim 19, wherein the vector w that is normal to the linear separating surface is given by:

w=A'Du, where A' is the transpose of A.

25. A method according to claim 19, wherein the locator coordinate γ that locates the linear separating surface relative to the origin is given by:

γ=−e'Du, where e' is the transpose of e.

26. A computer-implemented method of classifying a numerical data set comprising the steps of:

defining an input matrix A with m rows and n columns representing a set of m numerical data points having an input space with a dimension of n, wherein n corresponds to a number of features associated with the data set and each row belongs to either class A+ or A−, and further wherein the numerical data set represents financial data;

generating a support vector machine by solving a quadratic programming problem corresponding to the input matrix, wherein the quadratic programming problem is defined by a positive definite matrix Q:

$$Q = \frac{I}{v} + DK(G, G')D,$$

wherein G=D[A−e], G' is the transpose of G, v is a parameter associated with a distance between a pair of parallel bounding surfaces, I is an identity matrix, e is a vector of ones, D is a diagonal matrix of plus and minus 1's wherein a value on a diagonal of the D matrix is +1 if the corresponding row of the A matrix is in the class of A+ and −1 if the corresponding row of the A matrix is in the class of A−, and K is a mathematical kernel;

calculating a nonlinear separating surface with the support vector machine using a value u iteratively calculated by:

$$u^{i+1} = Q^{-1}(e + ((Qu^i - e) - \alpha u^i)_+), i=0,1,\ldots;$$

wherein $$0 < \alpha < \frac{2}{v}$$

and the + subscript replaces negative components by zeros; and dividing the set of financial numerical data into at least two subsets of data using the nonlinear separating surface, wherein the two subsets of data are located on opposite sides of the nonlinear separating surface and include at least two subsets of data to make one of a fraud detection decision and a credit decision.

27. A method according to claim 26, wherein the kernel K is a positive semidefinite kernel function.

28. A method according to claim 26, wherein the kernel K(A,B) maps $R^{m \times n} \times R^{n \times k}$ into $R^{m \times k}$ for $A \in R^{m \times n}$ and $B \in R^{n \times k}$.

29. A method according to claim 28, wherein the kernel K(A,B) is a Gaussian kernel.

30. A method according to claim 26, further comprising the step of solving the quadratic programming problem:

$$\min_{0 \le u \in R^m} f(u) := \frac{1}{2} u'Qu - e'u,$$

where u' is the transpose of u and e+ is the transpose of e.

31. A method according to claim 26, wherein the nonlinear separating surface is defined by:

$$K\left([x' - 1], \begin{bmatrix} A' \\ -e' \end{bmatrix}\right) Du = 0,$$

where x' is the transpose of an n-dimensional vector x, A' is the transpose of A and e' is the transpose of e.

32. A support vector computing machine to classify a numerical data set comprising:

an input module that generates an input matrix A with m rows and n columns representing a set of m numerical data having an input space with a dimension of n, wherein n corresponds to a number of features associated with the numerical data set and each row belongs to either class A+ or A−;

a processor that receives an input signal from the input module representing the numerical data, wherein the processor calculates an output signal representing a solution to a quadratic programming problem corresponding to the input signal, and the quadratic programming problem is defined by a positive definite matrix Q:

$$Q = \frac{I}{v} + HH',$$

wherein H=D[A−e], H' is the transpose of H, I is an identity matrix, v is a parameter associated with a distance between a pair of parallel bounding surfaces, e is a vector of ones, and D is a diagonal matrix of plus and minus 1's wherein a value on a diagonal of the D matrix is +1 if the corresponding row of the A matrix is in the class of A+ and −1 if the corresponding row of the A matrix is in the class of A−, and further wherein the processor calculates the solution to the quadratic programming problem using a value u iteratively calculated by:

$$u^{i+1}=Q^{-1}(e+((Qu^i-e)-\alpha u^i)_+), i=0,1,\ldots;$$

wherein $$0 < \alpha < \frac{2}{v}$$

the + subscript replaces negative components by zeros; and
an output module that divides the set of numerical data into a plurality of subsets of numerical data based on the output signal from the processor that corresponds to a separating surface calculated using the computed value of u, wherein the plurality of subsets of data are located on opposite sides of the separating surface and include at least two subsets of data to one of diagnose a medical condition of a patient, provide a medical prognosis for the patient, make fraud detection decisions and make credit decisions.

33. A machine according to claim 32, wherein a dimension of the positive definite matrix is equal to the dimension of (n+1).

34. A machine according to claim 32, wherein the separating surface is in the n-dimensional x space: x'w=γ, where w is orthogonal to the separating surface and γ locates the separating surface relative to an origin, and further wherein the vector w that is normal to the separating surface is given by w=A'Du and the locator coordinate γ that locates the separating surface relative to the origin is given by γ=−e'Du, where x' is the transpose of a vector x, A' is the transpose of A and e' is the transpose of e.

35. A machine according to claim 32, wherein the separating surface is a linear surface.

36. A computer-implemented method of classifying a set of patient data comprising the steps of:
defining an input matrix A with m rows and n columns representing a set of m patient data points having an input space with a dimension of n, wherein n corresponds to a number of features associated with each patient in the set of patient data and each row belongs to either class A+ or A−;
generating a support vector machine by solving a quadratic programming problem corresponding to the input matrix, wherein the quadratic programming problem is defined by a positive definite matrix Q:

$$Q = \frac{I}{v} + HH',$$

wherein H=D[A−e], H' is the transpose of H, I is an identity matrix, v is a parameter associated with a distance between a pair of parallel bounding planes, e is a vector of ones, and D is a diagonal matrix of plus and minus 1's wherein a value on a diagonal of the D matrix is +1 if the corresponding row of the A matrix is in the class of A+ and −1 if the corresponding row of the A matrix is in the class of A−;
calculating a separating surface with the support vector machine using a value u iteratively calculated by:

$$u^{i+1}=Q^{-1}(e+((Qu^i-e)-\alpha u^i)_+), i=0,1,\ldots;$$

wherein $$0 < \alpha < \frac{2}{v}$$

and the + subscript replaces negative components by zeros; and
dividing the set of patient data into a plurality of subsets of data using the calculated separating surface wherein the plurality of subsets are located on opposite sides of the separating surface and include at least two subsets of data to diagnose a medical condition of a patient.

37. A method according to claim 36, wherein a dimension of the positive definite matrix is equal to the dimension of (n+1).

38. A method according to claim 36, wherein the separating surface is a linear surface.

39. A method according to claim 36, wherein the separating surface is a nonlinear surface.

40. A method according to claim 36, wherein the plurality of subsets of data include a lymph node-positive set of medical data and a lymph node-negative set of medical data to diagnose the medical condition of the patient.

41. A method according to claim 36, wherein the set of patient data comprises a set of data indicating presence of metastasized lymph nodes.

42. A computer-implemented method of classifying a numerical data set comprising the steps of:
defining an input matrix A with m rows and n columns representing a set of m numerical data points having an input space with a dimension of n, wherein n corresponds to a number of features associated with the numerical data set and each row belongs to either class A+ or A−, and further wherein the numerical data set represents medical data;
generating a support vector machine by solving a quadratic programming problem corresponding to the input matrix, wherein the quadratic programming problem is defined by a positive definite matrix Q:

$$Q = \frac{I}{v} + DK(G, G')D,$$

wherein G=D[A−e], G' is the transpose of G, v is a parameter associated with a distance between a pair of parallel bounding surfaces, I is an identity matrix, e is a vector of ones, D is a diagonal matrix of plus and minus 1's wherein a value on a diagonal of the D matrix is −1 if the corresponding row of the A matrix is in the class of A+ and −1 if the corresponding row of the A matrix is in the class of A−, and K is a mathematical kernel;
calculating a nonlinear separating surface with the support vector machine by iteratively calculating a value u defined by:

$$u^{i+1}=Q^{-1}(e+((Qu^i-e)-\alpha u^i)_+), i=0,1,\ldots;$$

wherein $$0 < \alpha < \frac{2}{v}$$

and the + subscript replaces negative components by zeros; and dividing the set of numerical data into a plurality of subsets of data using the nonlinear separating surface, wherein the plurality of subsets include at least a good prognostic set of medical data and a poor prognostic set of medical data that are located on opposite sides of the separating surface.

43. A computer-implemented method of classifying a numerical data set comprising the steps of:

defining an input matrix A with m rows and n columns representing a set of m numerical data points having an input space with a dimension of n, wherein n corresponds to a number of features associated with the numerical data set and each row belongs to either class A+ or A−, and further wherein the numerical data set represents medical data;

generating a support vector machine by solving a quadratic programming problem corresponding to the input matrix, wherein the quadratic programming problem is defined by a positive definite matrix Q:

$$Q = \frac{I}{v} + DK(G, G')D,$$

wherein G=D[A −e], G' is the transpose of G, v is a parameter associated with a distance between a pair of parallel bounding surfaces, I is an identity matrix, e is a vector of ones, D is a diagonal matrix of plus and minus 1's wherein a value on a diagonal of the D matrix is +1 if the corresponding row of the A matrix is in the class of A+ and −1 if the corresponding row of the A matrix is in the class of A−, and K is a mathematical kernel;

calculating a nonlinear separating surface with the support vector machine by iteratively calculating a value u defined by:

$$u^{i+1} = Q^{-1}(e + ((Qu^i - e) - \alpha u^i)_+), i = 0, 1, \ldots;$$

wherein $$0 < \alpha < \frac{2}{v}$$

and the + subscript replaces negative components by zeros; and dividing the set of numerical data into a plurality of subsets of data using the nonlinear separating surface, wherein the plurality of subsets are located on opposite sides of the separating surface and include at least two subsets of data to diagnose a medical condition of a patient.

44. A support vector computing machine to classify a numerical data set comprising:

an input module that generates an input matrix A with m rows and n columns representing a set of m numerical data having an input space with a dimension of n, wherein n corresponds to a number of features associated with the numerical data set and each row belongs to either class A+ or A−;

a processor that receives an input signal from the input module representing the numerical data, wherein the processor calculates an output signal representing a solution to a quadratic programming problem corresponding to the input signal, and the quadratic programming problem is defined by a positive definite matrix Q:

$$Q = \frac{I}{v} + DK(G, G')D,$$

wherein G=D[A −e], G' is the transpose of G, v is a parameter associated with a distance between a pair of parallel bounding surfaces, I is an identity matrix, e is a vector of ones, D is a diagonal matrix of plus and minus 1's wherein a value on a diagonal of the D matrix is +1 if the corresponding row of the A matrix is in the class of A+ and −1 if the corresponding row of the A matrix is in the class of A−, and K is a mathematical kernel and further wherein the processor calculates the solution to the quadratic programming problem using a value u iteratively calculated by:

$$u^{i+1} = Q^{-1}(e + ((Qu^i - e) - \alpha u^i)_+), i = 0, 1, \ldots;$$

wherein $$0 < \alpha < \frac{2}{v}$$

the + subscript replaces negative components by zeros; and an output module that divides the set of numerical data into a plurality of subsets of numerical data based on the output signal from the processor that corresponds to a separating surface calculated using the computed value of u, wherein the plurality of subsets of data are located on opposite sides of the separating surface and include at least two subsets of data to one of diagnose a medical condition of a patient, provide a medical prognosis for the patient, make a fraud detection decision and make a credit decision.

* * * * *

UNITED STATES PATENT AND TRADEMARK OFFICE
CERTIFICATE OF CORRECTION

PATENT NO. : 7,395,253 B2  Page 1 of 1
APPLICATION NO. : 10/114419
DATED : July 1, 2008
INVENTOR(S) : Mangasarian et al.

It is certified that error appears in the above-identified patent and that said Letters Patent is hereby corrected as shown below:

On Column 14, line 16, (Claim 1), "]'s" should read --1's--

On Column 14, line 18, (Claim 1), "correspondina" should read --corresponding--

On Column 16, line 59, (Claim 19), "-1" should read --+1--

On Column 18, line 42, (Claim 30), "e+" should read --e'--

On Column 20, line 59, (Claim 42), "-1" should read --+1--

Signed and Sealed this

Fourteenth Day of October, 2008

JON W. DUDAS
*Director of the United States Patent and Trademark Office*